United States Patent [19]
Braud et al.

[11] Patent Number: 5,565,511
[45] Date of Patent: Oct. 15, 1996

[54] HIGH-SOLIDS ADHESIVES AND METHOD OF PRODUCING SAME

[75] Inventors: John W. Braud, Dalton; Helen G. Gilbreath, Calhoun, both of Ga.

[73] Assignee: XL Corporation, Calhoun, Ga.

[21] Appl. No.: 216,530

[22] Filed: Mar. 23, 1994

[51] Int. Cl.$^6$ ............ C08L 23/00; C08L 31/00; C08K 3/26; B32B 3/02

[52] U.S. Cl. .......... 524/270; 524/447; 524/425; 524/449; 524/451; 524/490; 524/493; 524/832; 524/836; 524/915; 428/95; 428/96; 428/97

[58] Field of Search .................. 524/270, 447, 524/425, 449, 451, 493, 490, 915, 832, 836; 428/95, 96, 97

[56] References Cited

U.S. PATENT DOCUMENTS

| | | | |
|---|---|---|---|
| 3,801,543 | 4/1974 | Meltsner | 260/45.95 C |
| 3,923,718 | 12/1975 | Arpin | 260/29.7 |
| 3,987,002 | 10/1976 | Lakshmanan | 260/32.8 |
| 4,350,723 | 9/1982 | Sugimura et al. | 428/42 |
| 4,647,607 | 3/1987 | Kay et al. | 524/77 |
| 4,663,377 | 5/1987 | Hombach et al. | 524/196 |
| 4,877,566 | 10/1989 | Cha | 264/118 |
| 5,087,651 | 2/1992 | Cha | 524/55 |
| 5,179,137 | 1/1993 | Okamoto et al. | 523/213 |
| 5,205,972 | 4/1993 | Kafka | 264/101 |
| 5,258,425 | 11/1993 | Kirby | 523/337 |

*Primary Examiner*—Paul R. Michl
*Assistant Examiner*—LaVonda R. DeWitt
*Attorney, Agent, or Firm*—Kerkam, Stowell, Kondracki & Clarke; Edward J. Kondracki

[57] ABSTRACT

A method of producing a high solids adhesive is provided wherein a buffered latex emulsion, such as, for example, styrene butadiene latex emulsion buffered to a pH of 11.0 using caustic agents, is combined with a non-emulsified mixture of dissolving process oils and tackifying resins and mineral fillers. The resultant adhesive has a solids content greater than previously achieved in the industry and has exceptional adhesive characteristics such as increased bond strength, improved durability, better aging, faster drying, improved water resistance and improved freeze resistance. High solids content is achieved by taking advantage of the excess emulsifiers in the latex emulsion and adding the remaining constituent components directly to the stabilized latex emulsion.

27 Claims, No Drawings

HIGH-SOLIDS ADHESIVES AND METHOD OF PRODUCING SAME

FIELD OF THE INVENTION

The present invention generally relates to water-based adhesives commonly used for applying floorcoverings and flooring materials, and for use in building construction, etc., and in particular to water-based adhesives having high solids content, low volatile organic compounds content and improved durability and bonding strength.

BACKGROUND OF THE INVENTION

Common adhesives intended for use in building construction and with flooring and floorcovering materials, such as, for example, wood plank, parquet, artificial turf, boat or other marine carpets, indoor carpet, rubber flooring, cove base, etc., are water-based emulsions based upon either acrylic or styrene butadiene (SBR) latex. Acrylic-based formulas, due to their expense and low bond strength, are generally reserved for use only when necessary for a pressure-sensitive applications, for resistance to plasticizers in pure vinyl backings or for resistance to sunlight in outdoor applications. SBR-based adhesives for use in building construction, flooring and floorcovering are, by far, the predominant type and require the addition of a tackifier to develop bond strength and a proper modulus.

The traditional means of producing an adhesive of this type is to emulsify the SBR latex to form a latex emulsion. Additional constituent components, such as, for example, process oil, tackifying resins, mineral fillers, etc., are also emulsified. The latex emulsion is then added to the constituent component emulsion under various heat and pressure conditions to form the adhesive.

The adhesives produced by the traditional method have several associated disadvantages, such as, for example, poor water resistance, slow drying, high volatile organic compound content and limitations on the final solids content of the adhesive. These disadvantages are generally due to the use of emulsifiers and thickeners in forming the adhesive. Emulsifiers and thickeners are generally water-soluble compounds that remain in the dried adhesive and tend to adversely affect the water resistance and durability of the resultant adhesive bond. Water soluble compounds also tend to retard the drying rate of the water-based adhesive. Moreover, using a method in which all constituent components are emulsified prior to mixing severely limits the solids content of the final product. It is particularly desirable to produce adhesives having a high solids content due to their superior bonding and drying characteristics.

It is also desirable to eliminate the presence of volatile organic compounds (VOC) generally present in traditional adhesives of the type described above VOCs are generally used to dissolve the tackifying resins which are incorporated into the adhesive to develop bond strength and an appropriate modulus. Since these resins are generally solid at room temperature, they must be liquified in order to be incorporated into the constituent component emulsion. This is usually done by dissolving the resin in an organic solvent carrier. Organic solvents are usually quite volatile and may have adverse effects on the environment due to their contribution to air pollution. VOCs also degrade the performance of the resulting adhesive by slowing down curing time, swelling and weakening the rubber component, shortening the life of the applied product and raising the level of emulsifier required for emulsion stability, which, in turn further degrades the adhesive. The use of organic solvents to produce adhesives, in some cases, also requires the use of expensive solvent recovery equipment required by government regulation and has the further disadvantage of exposing employees to the potentially harmful organic solvents.

VOCs are also incorporated into latex-based adhesives to improve their freeze resistance. Because traditionally formulated SBR-based adhesives have a high water content, they usually have poor freeze resistance. Manufacturers have sought to overcome the poor freeze resistance by introducing VOCs such as methanol and glycol to lower the freezing point of SBR-based adhesives. However, the addition of these VOCs results in many of the same disadvantages set forth above. In order to overcome the disadvantages associated with the use of VOCs for improved freeze resistance, some manufacturers have attempted to substitute non-volatile compounds such as sorbitol to improve freeze resistance. While freeze resistance may be improved in this manner, the water resistance of adhesives using non-volatile water-soluble compounds such as sorbitol is adversely affected.

SUMMARY OF THE INVENTION

It is, therefore, an object of this invention to provide an adhesive having a high solids content.

It is a further object of the present invention to provide an adhesive having improved bond strength and stability.

It is another object of the present invention to provide an adhesive containing little or no volatile organic compounds.

It is yet another object of the present invention to provide an adhesive that produces a bond having improved water resistance and durability.

It is still another object of the present invention to provide an adhesive having improved drying rates and faster application characteristics over prior art water-based adhesives.

Another object of the present invention is to provide a freeze-stable SBR-based adhesive having no VOCs and improved water resistance over adhesives containing non-volatile freeze resisting compound additives.

In order to realize these and other objects and to overcome the shortcomings set forth above with respect to conventional adhesives, a process for formulating an adhesive includes the steps of: stabilizing an emulsion of latex by adding a caustic agent to the latex emulsion to raise the pH of the emulsion; forming a mixture of dissolving oils, such as, for example naphthenic rubber process oil, and tackifying resins; mixing the stabilized latex emulsion with the mixture of dissolving oils and tackifying resins using vigorous agitation until a homogeneous emulsion is formed; and adding a predetermined amount of mineral filler and water to the homogeneous emulsion to form the adhesive.

Forming the adhesive in the above described manner provides an adhesive having very high solids content and improved durability, drying, bonding and water resistance. The process involves dissolving oils, tackifying resins and mineral fillers directly into a latex emulsion without emulsifying or dispersing the oils, resins or minerals prior to mixing. The method takes advantage of the excess emulsifier and stability of the latex emulsion combined with the mutual solubility of the latex polymer, oil and resin to produce a stable high solids viscous emulsion without the use of additional emulsifiers or thickening agents.

The present invention also eliminates the presence of volatile organic compounds. This is made possible by dissolving the resin directly into the oil without first using an organic solvent. In addition, further use of volatile organics is not required for increasing freeze resistance due to the low water content of the adhesive thus produced.

In addition, it is to be understood that the invention is not limited to any particular latex emulsion. While styrene butadiene latex is preferred, other latex emulsions of, for example, acrylic, nitrile, neoprene, vinyl acetate, ethylene vinyl acetate copolymers, carboxylated SBR, etc. or blends thereof, may be used depending upon the type of material being used and the substrate to which the material is being bonded.

DETAILED DESCRIPTION OF PREFERRED EMBODIMENTS

In order to increase the solids content of conventional latex-based adhesives, the present invention takes advantage of the excess emulsifier and stability of a stabilized latex emulsion combined with the mutual solubility of latex polymer, process oil and resin to produce a stable high solids viscous emulsion without the use of additional emulsifiers or thickening agents. Additional emulsifiers and thickening agents contribute to degraded adhesive characteristics and a decrease in solids content of the resultant adhesive. In this process, dissolved oils and tackifying resins are introduced directly into a stabilized latex emulsion to form a high solids adhesive having improved adhesive characteristics and freeze resistance.

The process begins with stabilization of a commercially available latex emulsion, such as, for example, Intex 131 and 132 available from Enichem America, and LPF 5356, LPF 6733, LPF 6687 all available from Goodyear, Butafan 125 and 104 available from BASF Corporation, Polytex 425 available from Rhom and Haas Corp. While SBR latex emulsions are specified herein, it is understood that various latex emulsions, such as, for example, acrylic homopolymers or copolymers, acrylonitrile butadiene (NBR), polychloroprene (neoprene), vinyl acetates, ethylene vinyl acetate copolymers, carboxylated SBR, etc., or blends thereof, may be used depending upon the materials being applied, the substrate to which the materials are bonded and the environmental conditions in which the bond will be present. The total solids of the preferred SBR latex emulsion is preferably in the range of 68–70% total solids. However, it is understood that the invention is not limited to a SBR latex emulsion having 68–70% total solids.

The latex emulsion must then be stabilized in order to allow the direct addition of constituent components without using additional emulsifiers or thickeners. To stabilize the latex emulsion, the latex emulsion is buffered to a pH in the range of 11.0 by a basic pH material, such as, for example, caustic soda, caustic potash, ammoniated tallow, dimethyl amine, diethyl amine, ammonia, dimethyl amino ethanol, urea, diethanol amine, triethanol amine, morpholine, etc. By buffering the latex emulsion in this manner, the emulsion is made stable and is ready to be mixed with the additional constituent components to form a stable high solids adhesive. The choice of buffering agent depends upon the latex emulsion or combination of emulsions used.

In a separate environment, tackifying resins, materials that are incorporated to increase bond strength and the modulus of the resulting adhesive, are dissolved in known non-volatile carrier liquids, such as, for example, naphthenic process oil. Commonly used tackifying resins include C9 hydrocarbon resin, tree rosin, ester of rosin having softening points in the range of 25°–115° C. etc. The preferred tackifier is pentaerythritol ester of rosin, commercially available from Hercules Inc. under the trade name Permalyn® 3100. While C9 hydrocarbon resin, tree rosin, and esters of rosin are specified, other resins may be used so long as they are compatible with the selected latex. Commonly used process oils include hydrotreated petroleum hydrocarbon oils having a carbon number mainly in the range of C20 to C50 and with few enough aromatics and paraffinics to be classified as naphthenic oil. Exemplary oils of this type include Calsol 8240 available from Calumet Oil Co., Circosol 4240 available from R. E. Carroll, Process Oil C-255-E available from C. E. Hall, etc. However, it is to be understood that while naphthenic process oil has been specified, other process oils that are not necessarily naphthenic may be used. For example, aromatic oil consisting of predominantly aromatic hydrocarbons having carbon numbers predominantly in the range of C20 to C50 may also be used.

The process oil and tackifying resin selected are mixed together and are preferably mixed at or above the melting point of the tackifying resin to ensure proper mixing. The tackifying resins used have melting points generally in the range of 25°–115° C. In the preferred method of the invention, the naphthenic process oil and tackifying resin are mixed together at a temperature of 210° F. to form a tackifying resin mixture to be added to the stabilized latex emulsion. It should be noted that tackifying resins will usually dissolve in the process oil without the benefit of additional heat; however, heating the mixture improves and enhances the dissolution of the resin and homogeneity of the resulting mixture.

In order to avoid brittleness in the final adhesive product, an antioxidant may be added to the process oil/tackifying resin mixture. Antioxidants of the hindered phenol type, such as, for example, Wingstay L available from Goodyear, or Santowhite Powder available from Harwick, are preferred. However, any compatible antioxidant may be used. Only trace amounts of antioxidant are required to avoid unacceptable brittleness in the final adhesive product.

Once the tackifying resin mixture is formed, it is ready for direct dissolution into the stabilized latex emulsion. The tackifying resin mixture is added to the stabilized latex emulsion under vigorous agitation until a homogeneous emulsion is formed. During agitation, trace amounts of defoamer, such as, for example, Foamkill 600 Series available from Crucible Chemical, Foammizer M-55 available from C. P. Hall, Nalco 5770 and 5772 available from Nalco Chemical, etc., and bactericide, such as, for example, Amerstat 251 available from Drew Chemical, may be added to reduce foaming and microbial contamination. It has been found that approximately 20 minutes are required to achieve a sufficiently homogeneous emulsion. However, different agitation times may be required depending upon the starting materials selected. Mixing these components in this manner eliminates the conventional step of emulsifying the tackifying materials prior to mixing with the latex emulsion. The present invention takes advantage of the excess emulsifiers present in the latex emulsion to enable the tackifying mixture to be added directly to the stabilized latex emulsion. The direct addition of the tackifying mixture to the stabilized latex emulsion is critical in achieving a high solids adhesive product.

After the homogeneous emulsion of tackifying material and latex is formed, mineral fillers, in the form of finely ground powder, are added slowly with vigorous agitation to thicken the mixture. Mineral fillers are also used to control the amount of tack and viscosity of the final adhesive product. Commercially known fillers, such as, for example, kaolin clay available from Georgia Kaolin, calcium carbonate available under the trade name #9 Whiting available from Georgia Marble Corp., feldspar available under the trade name G-Fill from Feldspar Corp., etc., are preferable. It should be noted, however, that any compatible mineral filler may be used. During addition of the mineral filler, water, or a slurry of water and mineral filler, may be added to ensure proper mixing of the filler with the homogeneous emulsion of tackifying resin and latex.

In a preferred embodiment of the present invention, the following proportions of the constituent components of the high solids adhesive are used. It is to be understood, however, that many variations in the amounts of the various constituent components may be made and that the following example is to be considered illustrative, not limiting.

| Ingredient | Amount wt % |
| --- | --- |
| 1. Cold polymerized high solids SBR latex (68–70% total solids) buffered to 11.0 pH with suitable caustic agent | 29.0 |
| 2. a. Naphthenic rubber process oil | 14.0 |
| b. Tackifying Resin (25–115° C. melting point) | 14.0 |
| c. Antioxidant (hindered Phenol type) | 1.0 |
| Mix 2a, 2b, and 2c together at 210° F. Mix 1 and 2 together with vigorous agitation until emulsion is homogeneous. Defoamer and bactericide/antimicrobial agent may be added to reduce foaming and contamination. Then blend in the following ingredients in turn, blending thoroughly before proceeding to the next step. | |
| 3. Mineral filler, added slowly with vigorous agitation | 30.0 |
| 4. Water to desired precalculated final solids. For approximately 85% total solids add this amount | 3.5 |
| 5. Mineral filler, as in step 3. | 8.5 |

Constituents 4 and 5 may be in the form of a slurry of washed clay in water, such as, for example, Huber 90 clay available from Huber, mixed in an aqueous slurry with the appropriate amount of water. Using the above described constituent components results in a high solids adhesive having approximately 85% solids content, the highest known of any multi-purpose adhesive in the industry. Previously, the highest known available solids content adhesives had solid contents in the range of 70–71% solids. While solids contents in the range of 84–87% solids are preferred, any range of solids content may be achieved by the present invention. For example, if solids content of greater than 87% or less than 85% are required, the water and mineral filler amounts can be accordingly adjusted to arrive at the desired solids level. Thus, the invention is not limited to solids percentages in the range of 84–87%, but can be in any range up to approximately 95%+ solids content.

The viscosity of the adhesive resulting from employing the process of the present invention is in the neighborhood of 100,000 centipoise (cps). The viscosity of the resultant adhesive may be adjusted as required in a particular application by modifying the amounts of water and mineral fillers added to the homogeneous emulsion. Common viscosity ranges for floorcovering adhesives are in the range of 30,000 to 150,000 cps. Using the present invention will allow one skilled in the art to adjust the constituent component amounts to achieve viscosities in most any desired range for adhesives of this type.

Other illustrative examples of high solids adhesives achievable by the present invention are shown below:

| Ingredient | Amount wt % |
| --- | --- |
| 1. Latex blend of: Butafan 104 | 25.0 |
| and Polytex 425. Raise pH of blend to 11.0 using suitable caustic agent | 5.0 |
| 2. a. Ergon V 2000 oil | 15.0 |
| b. Methyl Ester of Rosin | 13.0 |
| c. Santo White Powder | .5 |
| Blend 2a, 2b, and 2c together, warm to 210° F. and add 1 to 2 with vigorous agitation. Continue agitation until a stable emulsion is formed (about 20 min) and then add each of the following blends into the mix in order. | |
| 3. Lithospar P (Spartan Minerals Div. of Kmg Minerals, Inc.) | 29.0 |
| 4. Water | 3.0 |
| 5. Mica finely ground | 9.5 |

The adhesive resulting from the mixture shown in Example 2 has a viscosity of 110,000 cps and a total solids content of 87.1%. The adhesive of Example 2 also has no VOCs and bond strength in the range of 11–16 lb/in.

| Ingredient | Amount wt % |
| --- | --- |
| 1. Intex 132 Latex (pH 11.1) | 24.0 |
| 2. a. Calsol 8240 oil | 12.0 |
| b. AP-10 Resin (Hercules Corp.) | 12.0 |
| c. Wingstay L Antioxidant | .25 |
| Blend 2a, 2b and 2c together at 200° F. Add mixture to 1 with agitation - agitate 15 minutes. | |
| 3. Kaolin Clay - add with agitation | 6.0 |
| 4. #10 Whiting (CaCo$_3$) - add with agitation | 24.0 |
| 5. Water - agitate | 9.75 |
| 6. #10 Whiting - agitate | 12.0 |

The resultant adhesive of Example 3 is a viscous paste having 80+% solids, fast drying characteristics and bond strengths that exceed the tear strengths of most carpets.

Adhesives made by the present invention are excellent adhesives for indoor or outdoor installation of flooring materials, such as, for example, wood plank or parquet, artificial turf, boat or other marine carpets, all indoor carpet, rubber flooring or cove base.

Additionally, lower solids content adhesives may also be produced using the method of the present invention. Lower solids adhesives are generally used in average installations involving carpets with woven synthetic, jute or low density urethane backings. However, it must be noted that lower solids content adhesives do not exhibit the increased bond strength, durability, freeze resistance, water resistance and improved drying characteristics of high solids content adhesives described above.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined herein and in the following claims.

What is claimed is:

1. A method for producing a latex based adhesive comprising the steps of:

stabilizing an emulsion of latex by adding a caustic agent to said emulsion to raise the pH of said emulsion;

forming a mixture comprising dissolving a tackifying resin into a process oil;

mixing said stabilized latex emulsion with said mixture using vigorous agitation to form a homogeneous emulsion; and adding a predetermined amount of mineral filler and water to said homogeneous emulsion using vigorous agitation to form the adhesive.

2. The method of claim 1, wherein said emulsion of latex comprises at least one of the group consisting of emulsions of: styrene butadiene, acrylic homopolymers, acrylic copolymers, acrylonitrile butadiene, polychloroprene, vinyl acetates, ethylene vinyl acetate copolymers and carboxylated styrene butadiene.

3. The method of claim 1, wherein said mineral filler comprises at least one of the group consisting of: kaolin clay, calcium carbonate, silica, mica, talc and feldspar.

4. The method of claim 1, wherein said tackifying resin comprises at least one of the group consisting of: C9 hydrocarbon resin, wood rosin, ester of rosin and pentaerythritol ester of rosin.

5. The method of claim 1, wherein said process oil comprises severely hydrotreated petroleum hydrocarbon oil, having predominantly hydrocarbons with carbon numbers in the range of C20 to C50.

6. The method of claim 5, wherein said process oil is naphthenic process oil.

7. The method of claim 1, wherein said caustic agent comprises at least one of the group consisting of: caustic soda, caustic potash, ammoniated tallow, dimethyl amino ethanol, diethyl amine, ammonia, urea, diethanol amine, triethanol amine, morpholine and dimethyl amine.

8. The method of claim 1, wherein the pH of said emulsion is raised to a pH of 11.0 by adding said caustic agent to said emulsion.

9. The method of claim 2, wherein said emulsion of latex is an emulsion of styrene butadiene latex having total solids in the range of 65–75%.

10. The method of claim 1, comprising the further step of adding trace amounts of an antioxidant to said mixture of tackifying resin and process oil.

11. The method of claim 1, comprising the further step of adding trace amounts of a defoamer and an anti-microbial during mixture of the stabilized latex emulsion and said mixture of tackifying resin and process oil.

12. The method of claim 10, wherein said antioxidant is a hindered phenol.

13. The method of claim 1, wherein the step of mixing the tackifying resin with process oil is conducted at a sufficiently high temperature to facilitate the dissolution of the tackifying resin.

14. The method of claim 1, wherein the mineral filler and water are formed into a slurry prior to adding the mineral filler and water to the homogeneous emulsion.

15. An adhesive compound comprising:

latex, process oil, tackifying resin, mineral filler and water, said adhesive compound having a total solids content greater than 71%.

16. The adhesive compound of claim 15, wherein said latex comprises at least one of the group consisting of: styrene butadiene, acrylic homopolymers, acrylic copolymers, acrylonitrile butadiene, polychloroprene, vinyl acetates, ethylene vinyl acetate copolymers and carboxylated styrene butadiene.

17. The adhesive compound of claim 15, wherein said mineral filler comprises at least one of the group consisting of: kaolin clay, calcium carbonate and feldspar.

18. The adhesive compound of claim 15, wherein said tackifying resin comprises at least one of the group consisting of: C9 resin, wood rosin, ester of rosin and pentaerythritol ester of rosin.

19. The adhesive compound of claim 15, wherein said process oil comprises severely hydrotreated petroleum hydrocarbon oil, having predominantly hydrocarbons with carbon numbers in the range of C20 to C50.

20. The adhesive compound of claim 19, wherein said process oil is naphthenic process oil.

21. The adhesive compound of claim 15, wherein said latex is styrene butadiene latex having total solids in the range of 65–75%.

22. The adhesive compound of claim 15, wherein the total solids content of said adhesive compound is in the range of greater than 80%.

23. An adhesive compound comprising:

29 wt % of cold high solids styrene butadiene latex buffered to a pH of 11.0 using a caustic agent;

14 wt % of process oil;

14 wt % of tackifying resin;

30 wt % of a first mineral filler;

3.5 wt % of water; and 8.5 wt % of a second mineral filler, said adhesive compound having a total solids content in the range of greater than 80%.

24. The adhesive compound of claim 23, wherein said process oil comprises severely hydrotreated petroleum hydrocarbon oil, having predominantly hydrocarbons with carbon numbers in the range of C20 to C50.

25. The adhesive compound of claim 23, wherein said tackifying resin comprises at least one of the group consisting of: C9 hydrocarbon resin, wood rosin, ester of rosin and pentaerythritol ester of rosin.

26. The adhesive compound of claim 23, wherein said first and second mineral fillers comprise at least one of the group consisting of: kaolin clay, calcium carbonate and feldspar.

27. The adhesive compound of claim 23, wherein said caustic agent comprises at least one of the group consisting of: caustic soda, caustic potash, ammoniated tallow, dimethyl amino ethanol, diethyl amine, ammonia, urea, diethanol amine, triethanol amine, morpholine and dimethyl amine.

* * * * *